(12) United States Patent
Thaut et al.

(10) Patent No.: US 11,656,679 B2
(45) Date of Patent: May 23, 2023

(54) MANIPULATOR-BASED IMAGE REPROJECTION

(71) Applicant: Microsoft Technology Licensing, LLC, Redmond, WA (US)

(72) Inventors: Benjamin Markus Thaut, Eningen unter Achalm (DE); Anthony James Ambrus, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 127 days.

(21) Appl. No.: 17/005,201

(22) Filed: Aug. 27, 2020

(65) Prior Publication Data

US 2022/0066546 A1    Mar. 3, 2022

(51) Int. Cl.
```
G06F 3/01      (2006.01)
G02B 27/00     (2006.01)
G02B 27/01     (2006.01)
G06F 3/033     (2013.01)
G09G 5/377     (2006.01)
G09G 5/38      (2006.01)
```

(52) U.S. Cl.
CPC ......... *G06F 3/012* (2013.01); *G02B 27/0093* (2013.01); *G02B 27/0172* (2013.01); *G06F 3/033* (2013.01); *G09G 5/377* (2013.01); *G09G 5/38* (2013.01); *G02B 2027/014* (2013.01); *G02B 2027/0138* (2013.01); *G09G 2320/106* (2013.01); *G09G 2354/00* (2013.01)

(58) Field of Classification Search
CPC ..... G06F 3/012; G06F 3/033; G02B 27/0093; G02B 27/0172; G02B 2027/0138; G02B 2027/014; G09G 5/377; G09G 5/38; G09G 2320/106; G09G 2354/00
See application file for complete search history.

(56) References Cited

U.S. PATENT DOCUMENTS

| 2006/0232584 | A1* | 10/2006 | Utsugi | H04N 13/128 |
| | | | | 345/426 |
| 2010/0041992 | A1* | 2/2010 | Ohuchi | A61B 8/08 |
| | | | | 600/443 |
| 2016/0018985 | A1 | 1/2016 | Bennet et al. | |

(Continued)

FOREIGN PATENT DOCUMENTS

EP    2902874 A1    8/2015

OTHER PUBLICATIONS

"International Search Report and Written Opinion Issued in PCT Application No. PCT/US21/034122", dated Sep. 13, 2021, 12 Pages.

*Primary Examiner* — Dmitriy Bolotin
(74) *Attorney, Agent, or Firm* — Alleman Hall Creasman & Tuttle LLP

(57) ABSTRACT

Examples are disclosed that relate to image reprojection. One example provides a method, comprising receiving a first rendered image comprising content associated with a viewer reference frame, receiving a second rendered image comprising content associated with a manipulator reference frame, and reprojecting the first rendered image based on a head pose of a user to thereby produce a first reprojected image. The method further comprises reprojecting the second rendered image based on the head pose of the user and a pose of the manipulator to thereby produce a second reprojected image, and outputting the first reprojected image and the second reprojected image for display as a composited image.

17 Claims, 7 Drawing Sheets

(56) References Cited

U.S. PATENT DOCUMENTS

2017/0199750 A1* 7/2017 Reuschel ................ G06F 9/452
2017/0278304 A1* 9/2017 Hildreth ............. G02B 27/0172
2020/0368616 A1* 11/2020 Delamont ............. A63F 13/213

* cited by examiner

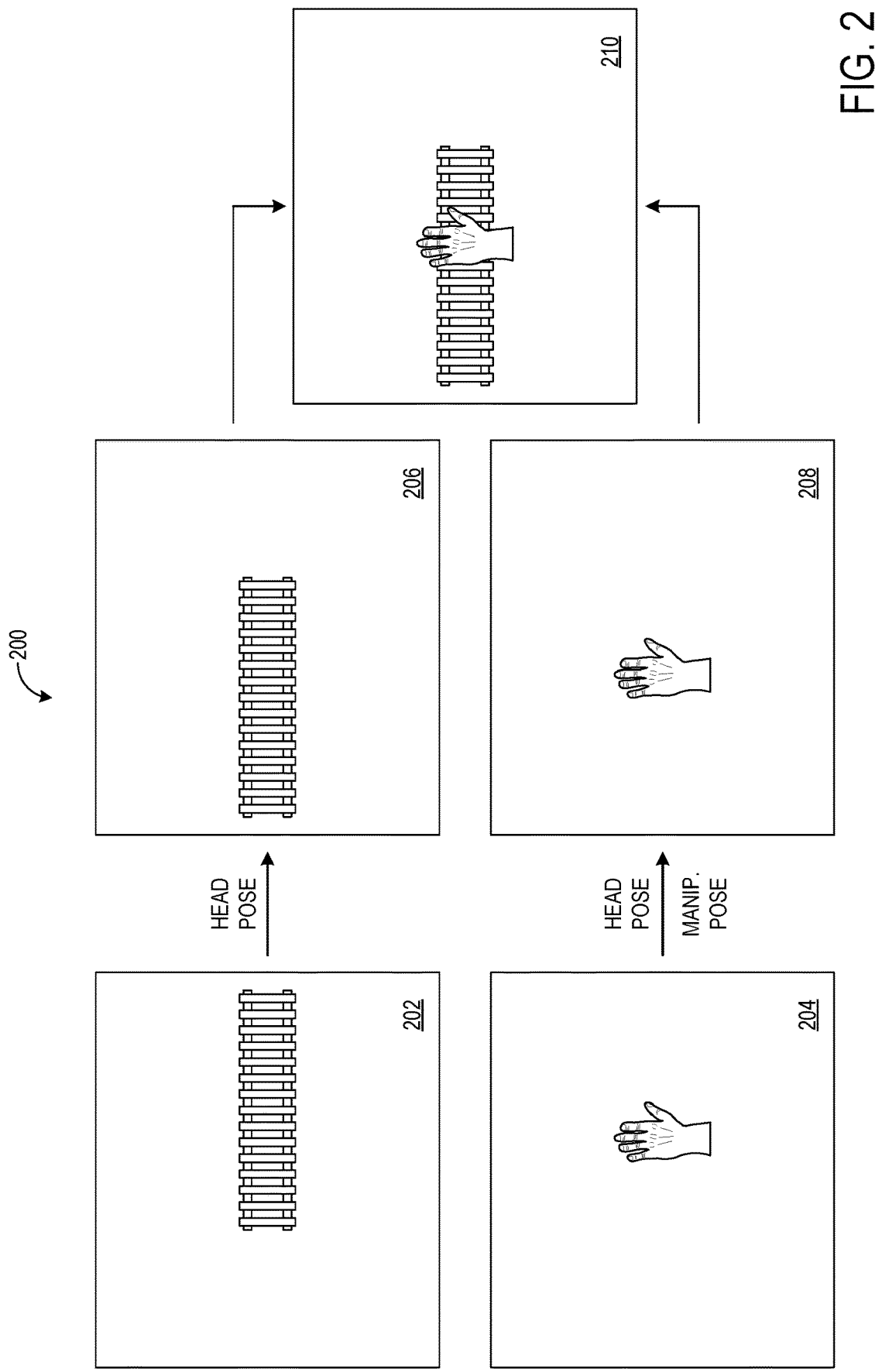

MANIPULATOR-BASED IMAGE REPROJECTION

BACKGROUND

On a head-mounted display device, virtual imagery may be rendered based on the head pose of a wearer of the display device. For example, a virtual object may be rendered at a position on the display device that changes with head pose so that the virtual object appears to be anchored to a fixed position in a surrounding physical environment.

SUMMARY

Examples are disclosed that relate to image reprojection. One example provides a method comprising receiving a first rendered image comprising content associated with a viewer reference frame, receiving a second rendered image comprising content associated with a manipulator reference frame, and reprojecting the first rendered image based on a head pose of a user to thereby produce a first reprojected image. The method further comprises reprojecting the second rendered image based on the head pose of the user and a pose of the manipulator to thereby produce a second reprojected image, and outputting the first reprojected image and the second reprojected image for display as a composited image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows an example data processing pipeline with which manipulator-attached and non-manipulator-attached content may be reprojected separately.

DETAILED DESCRIPTION

As mentioned above, on a head-mounted display (HMD) device, virtual imagery may be rendered based on the head pose of a wearer of the HMD device. For example, a virtual object may be rendered at a position on the HMD device that changes with the head pose so that the virtual object appears to be anchored to a fixed position in the surrounding physical environment. A wearer's head pose may also be used to reproject virtual imagery to compensate for changes in head pose between the time at which the virtual imagery is rendered and the time at which the virtual imagery is displayed. For example, virtual imagery may be rendered based on an initial head pose—e.g., a head pose determined at or before the time of rendering the virtual imagery—and subsequently reprojected based on an updated head pose—e.g., a head pose sensed following the time of rendering the virtual imagery. Reprojection may include adjusting the position of pixel(s) of an image that encode the virtual imagery, as one example.

Delays between render and display time may arise from various sources, such as the time between transmitting virtual imagery from a graphics processing unit (GPU) to a display. Transmission-related delays may be greater where virtual imagery is transmitted from a remote device to a display that presents the virtual imagery. Further, the display of virtual imagery itself may cause delays due to the time taken to readout data and emit light forming the virtual imagery.

In some examples, virtual imagery may be rendered on an HMD device based on the position of a wearer's hand, or the position of an input device manipulated by the wearer's hand. A user's hand, or an input device manipulated by a user's hand(s), is referred to herein as a "manipulator", and virtual imagery rendered based on the position of manipulator(s) is referred to herein as "manipulator-attached content" or as being "manipulator-attached". The use of a manipulator may introduce additional delays between the render and display times of manipulator-attached content, for example due to processing a manipulator position, updating a scene graph, and/or other simulation-related actions. These and other delays may result in manipulator-attached content appearing to lag behind manipulator movement, which may impact a mixed reality display experience. The disconnect between manipulator movement and movement of manipulator-attached content may be especially apparent in augmented reality experiences in which the surrounding physical environment is visible.

Figure 1A:
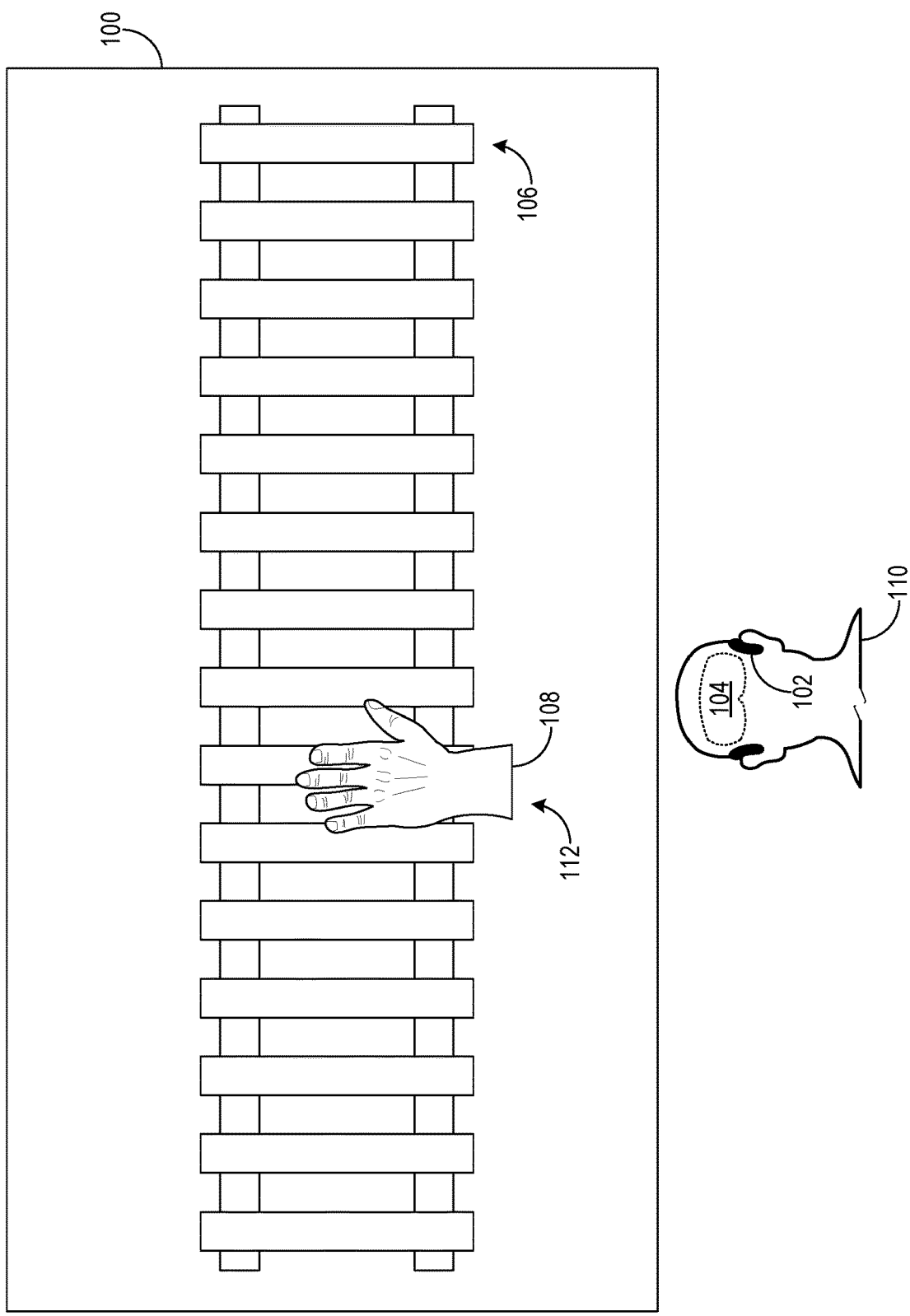
FIGS. 1A-1B illustrate the example reprojection of an image including manipulator-attached content.
Figure 1B:
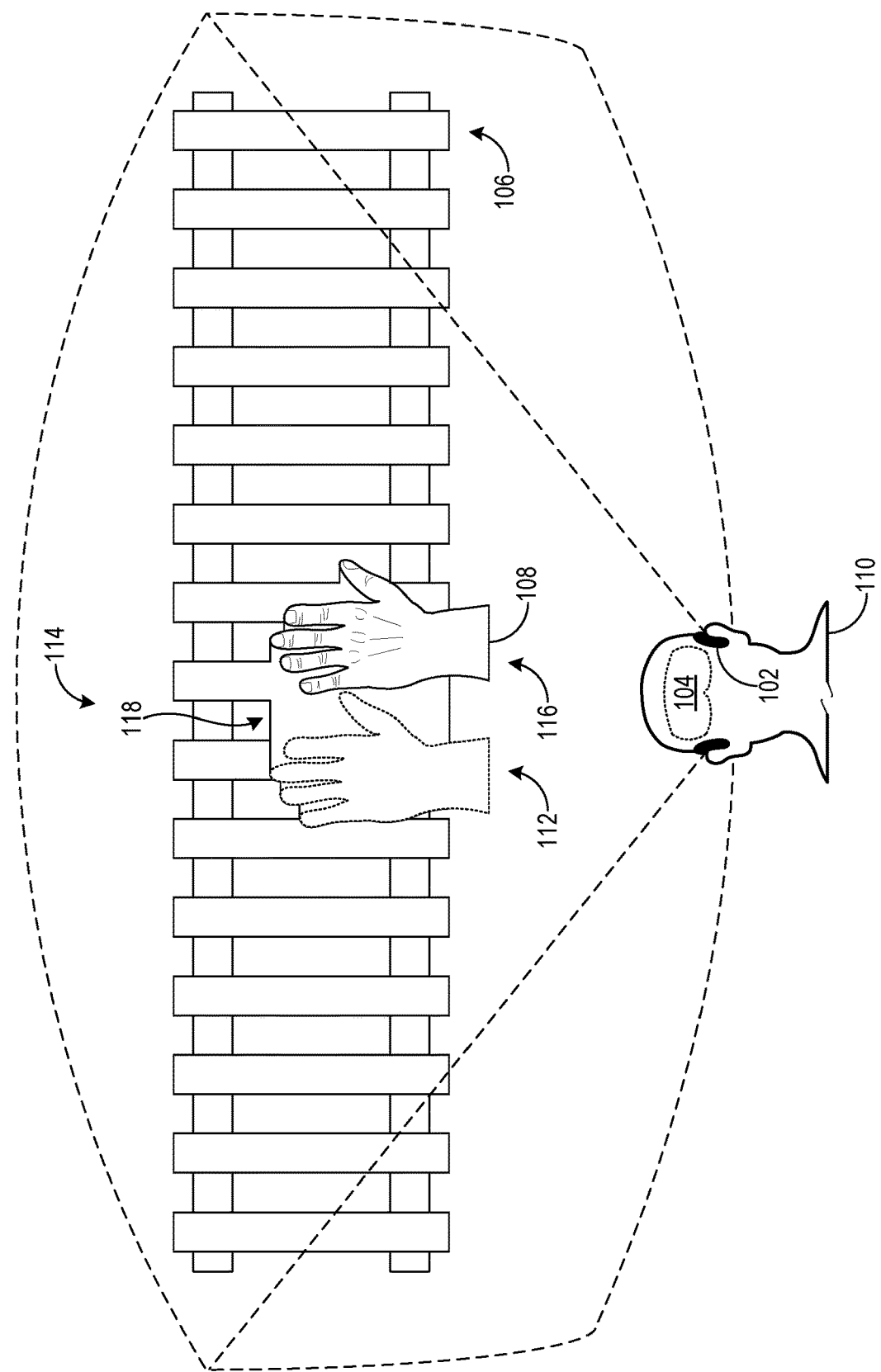

FIGS. 1A-1B illustrate the reprojection of an image 100 including manipulator-attached content. As described below, the reprojected image produced by reprojecting image 100 is presented on an HMD device 102 via a display 104. Image 100 includes a virtual fence 106 and manipulator-attached content in the form of a virtual hand model 108, which is displayed at a position that is updated according to movement of a hand of a user 110 wearing HMD device 102. At the time of rendering image 100, the position of the user's hand is such that hand model 108 is rendered at a position 112 based on the hand position as determined at or before render time. However, the position of the user's hand, as well as the pose of the user's head, changes after rendering image 100. To compensate for the motion of user 110 after rendering image 100, the image is reprojected based on the user's head pose as determined at a time later than the render time of image 100.

FIG. 1B shows a reprojected image 114 produced by reprojecting image 100. Reprojected image 114 is presented on HMD device 102 via display 104. As a result of the change in the position of the user's hand, hand model 108 is displayed at an updated position 116 different than the position 112 at which the hand model was rendered in image 100. However, reprojecting image 100 based on the user's head pose—e.g., an updated head pose determined after rendering image 100—produces artifacts in reprojected image 114. In this example, the reprojection produces a hole 118 that distorts virtual fence 106 and omits image content that otherwise should be displayed in reprojected image 114. Hole 118 may result from the occlusion of virtual fence 106 by hand model 108, for example. Generally, other factors such as large or rapid motion of manipulator-attached content may produce artifacts in images generated via reprojection based on head pose. Due to the relative ease with which they may be perceived by users, hole 118 and other artifacts may reduce the feeling of immersion in a mixed reality experience presented on HMD device 102.

In view of the above, examples are disclosed that relate to reprojecting manipulator-attached content separately from non-manipulator-attached content. FIG. 2 shows an example data processing pipeline 200 with which manipulator-attached and non-manipulator-attached content may be reprojected separately. In the depicted example, pipeline 200 receives a first rendered image 202 comprising content that is associated with a viewer reference frame and is not manipulator-attached. The viewer reference frame may be associated with a user of an HMD device on which the output from pipeline 200 is displayed, for example. Pipeline 200 further receives a second rendered image 204 comprising content associated with a manipulator reference frame. The manipulator reference frame may be associated with a hand of a user (e.g., a user of an HMD device) and/or an input device manipulated by the user. As one example, the input device may be a handheld controller including a motion sensing system (e.g., inertial measurement unit) that outputs motion data regarding the handheld controller.

First rendered image 202 is reprojected based on the head pose of a user to thereby produce a first reprojected image 206. The head pose may be determined in any suitable manner. As one example, an HMD device may include a motion sensing system operable to output a head pose, or data that may be used to determine a head pose, of a user wearing the HMD device. An example motion sensing system and HMD device are described below with reference to FIG. 4.

The reprojection of first rendered image 202 may be performed in any suitable manner. As one example, the position of a pixel $p_{render}$ of first rendered image 202 may be reprojected according to the following: $p_{latest} = (X_{latest} * X^{-1}_{render}) p_{render}$, where $p_{latest}$ is the final reprojected position of the pixel, $X_{latest}$ is a head pose determined after the render time of the first rendered image, and $X^{-1}_{render}$ is the inverse of a head pose determined at or before the render time of the first rendered image. In some examples, $X_{latest} * X^{-1}_{render}$ may be matrices (e.g., 4×4) representing affine transformations that may be multiplied. Any suitable number of pixels of first rendered image 202 may be reprojected to produce first reprojected image 206. In some examples, every pixel of first rendered image 202 may be reprojected to produce first reprojected image 206.

Second rendered image 204 is reprojected based on the head pose of a user and a pose of a manipulator to thereby produce a second reprojected image 208. As described above, a motion sensing system integrated in an HMD device, or any other suitable mechanism, may be used to determine the head pose. Likewise, the pose of the manipulator may be determined in any suitable manner. As one example, an HMD device may include an imaging system operable to capture image data representing the manipulator, where the image data may be processed (on-board or off-board the HMD device) to determine the manipulator pose. Where the manipulator is a hand, hand tracking may be used to determine the manipulator pose. In other examples, the manipulator may be an input device that includes an integrated motion sensing system (e.g., an inertial measurement unit (IMU)). In such examples, the manipulator pose may be determined (on-board or off-board the HMD device) based on output from the input device motion sensing system.

As one example, a pixel $p_{render}$ of second rendered image 204 may be reprojected according to the following: $p_{latest} = (X_{latest} * M_{latest} * M^{-1}_{render} * X^{-1}_{render}) p_{latest}$, where $p_{latest}$ is the final reprojected position of the pixel, $X_{latest}$ is a head pose determined after the render time of the second rendered image, $M_{latest}$ is the pose of a manipulator determined after the render time of the second rendered image, $M^{-1}_{render}$ is the inverse of the pose of the manipulator determined at or before the render time of the second rendered image, and $X^{-1}_{render}$ is the inverse of a head pose determined at or before the render time of the second rendered image. In some examples, $X_{latest}$, $M_{latest}$, $M^{-1}_{render}$, and $X^{-1}_{render}$ may be matrices (e.g., 4×4) representing affine transformations that may be multiplied. Any suitable number of pixels of second rendered image 204 may be reprojected to produce second reprojected image 208. In some examples, every pixel of second rendered image 204 may be reprojected to produce second reprojected image 208.

After reprojection, first and second reprojected images 206 and 208 are composited to thereby produce a composited image 210. Composition may include any suitable image processing steps, including but not limited to overlaying manipulator-attached content over content that is not manipulator-attached, and blending content. Composited image 210 includes the reprojected content associated with the viewer reference frame in first reprojected image 206 and the reprojected content associated with the manipulator reference frame in second reprojected image 208. However, in contrast to reprojection pipelines that reproject manipulator-attached content based on head pose alone, and that reproject manipulator-attached content with content that is not manipulator-attached in a single image based on head pose, composited image 210 does not include artifacts resulting from the reprojection process. By reprojecting separate images that respectively include and do not include manipulator-attached content, the occlusion of virtual imagery such as the virtual fence in first rendered image 202 may be mitigated, in turn reducing or eliminating reprojection artifacts. Further, latency in the movement of manipulator-attached content may be reduced by performing reprojection based on a manipulator pose determined after rendering the manipulator-attached content. These and other aspects of pipeline 200 may enhance user immersion in a mixed reality experience presented on an HMD device.

The processes performed in pipeline 200 may be implemented at any suitable device. In some examples, at least a portion of pipeline 200 may be implemented on a device that is separate from an HMD device that presents composited image 210. For example, the separate device may render first and second rendered images 202 and 204 and transmit the rendered images via a suitable communication mechanism (e.g., a wireless network connection) to the HMD device, which may then reproject the first and second images, composite the reprojected images, and display the resulting composited image. In another example, the separate device may render first and second rendered images 202 and 204, reproject the first and second rendered images, and transmit first and second reprojected images 206 and 208 to the HMD device, which may then composite the reprojected images and display the resulting composited image. In yet another example, the separate device may render first and second rendered images 202 and 204, reproject the first and second rendered images, composite the first and second reprojected images, and output the resulting composited image to the HMD device for display. Performing at least some steps on such an off-board device may reduce power consumption and consumption of computing resources at an HMD device, which may help to increase the operational duration of the HMD device per battery charge in implementations where the HMD device is battery-powered. In other examples, pipeline 200 can be fully implemented on an HMD device, without the use of a separate device for a portion of the pipeline. In such examples, the latency in movement of manipulator-attached content may be further reduced. Further, in some examples the HMD device may reproject composited image 210 based on head pose—e.g., a most recently determined head pose determined after the composition of reprojected images.

Figure 3:
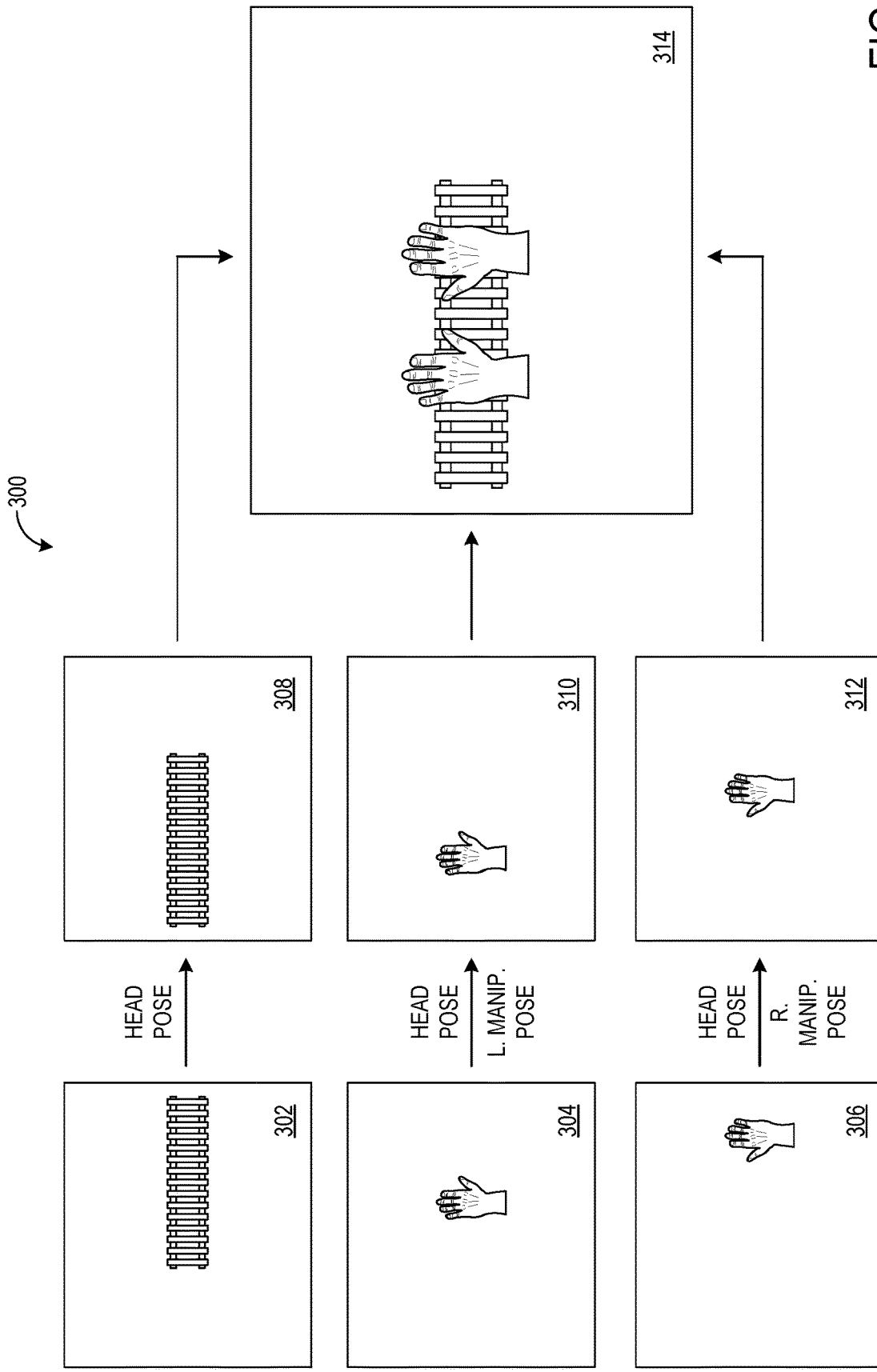
FIG. 3 illustrates an example pipeline with which left-manipulator-attached, right-manipulator-attached, and non-manipulator-attached content may be reprojected separately.

In some examples, content attached to a left manipulator and content attached to a right manipulator may be reprojected separately and then composited for display. FIG. 3 illustrates an example pipeline 300 with which left-manipulator-attached, right-manipulator-attached, and non-manipulator-attached content may be reprojected separately. As shown, pipeline 300 receives a first rendered image 302 comprising non-manipulator-attached content associated with a viewer reference frame, a second rendered image 304 comprising content associated with a first manipulator reference frame corresponding to a left manipulator (e.g., a left hand or input device operated via the left hand), and a third rendered image 306 comprising content associated with a second manipulator reference frame corresponding to a right manipulator (e.g., a right hand or input device operated via the right hand). First rendered image 302 is reprojected based on a head pose to produce a first reprojected image 308. Second rendered image 304 is reprojected based on the head pose and a pose of the left manipulator to produce a second reprojected image 310. Third rendered image 306 is reprojected based on the head pose and a pose of the right manipulator to produce a third reprojected image 312. First, second, and third reprojected images 308, 310, and 312 are then composited to produce a composited image 314 for display.

In the example depicted in FIG. 3, content attached to a left manipulator and content attached to a right manipulator are respectively arranged in separate images and separately reprojected based on the pose of a corresponding manipulator. However, examples are possible in which an image is reprojected that includes both content associated with a first manipulator reference frame corresponding to a left manipulator, and content associated with a second manipulator reference frame corresponding to a right manipulator in the same image. In such examples, the left manipulator-attached content and right manipulator-attached content may be segmented and the respective segments separately reprojected by reprojecting image pixels in the segment corresponding to the left manipulator-attached content based on head pose and left manipulator pose, and reprojecting image pixels in the segment corresponding to the right manipulator-attached content based on head pose and right manipulator pose. In other examples, any other suitable method of reprojecting content attached to different manipulators in a common image may be employed.

In some examples, motion vectors representing motion in an image comprising content attached to a manipulator may be updated based on a pose of the manipulator. As one example, motion vectors may be updated (e.g., via one or more matrix transformations) based on a manipulator pose at the time of compositing an image comprising non-manipulator-attached content with one or more images comprising manipulator-attached content. The manipulator pose may be determined at or before composition time. Updating motion vectors based on manipulator pose may yield a more representative indication of motion in the pixels corresponding to the motion vectors by capturing manipulator motion occurring after initial generation of the motion vectors. Motion vectors updated in this manner may be used for any suitable purpose, including but not limited to reprojection, image/video encoding, and/or prediction of future manipulator and/or manipulator-attached content. Further, motion vectors may be obtained in any suitable manner—for example, by receiving or requesting motion vectors from an application rendering manipulator-attached content, and/or by deriving motion vectors from motion among two or more images.

Figure 4:
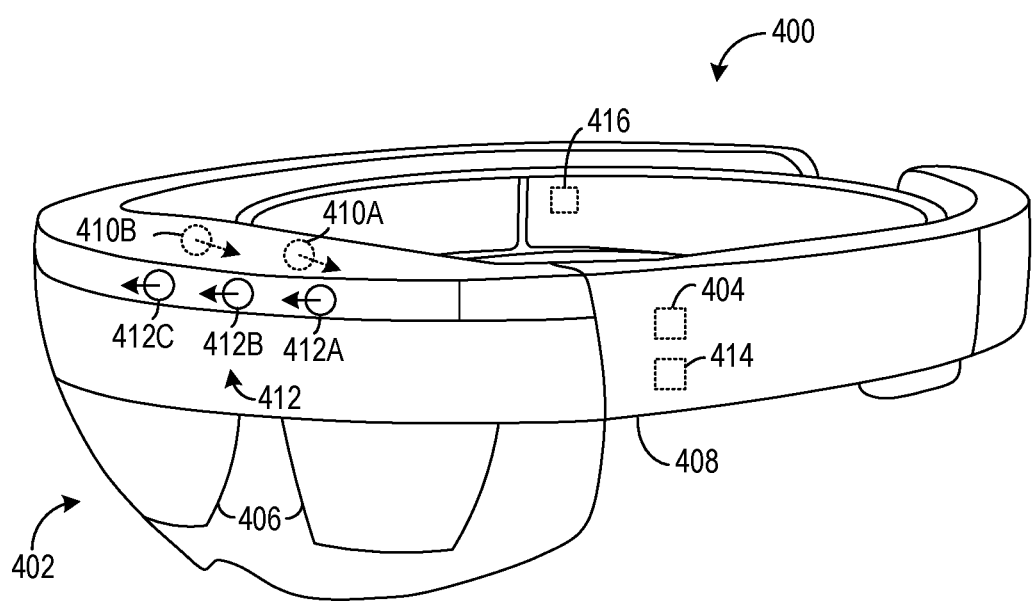
FIG. 4 shows an example HMD device.

FIG. 4 shows an example HMD device 400. HMD device 400 includes a near-eye display 402 configured to present any suitable type of visual experience. In some examples, display 402 is substantially opaque, presenting virtual imagery as part of a virtual reality experience in which a wearer of HMD device 400 is completely immersed in the virtual reality experience. In other implementations, display 402 is at least partially transparent, allowing a user to view presented virtual imagery along with a real-world background viewable through the display to form an augmented reality experience, such as a mixed reality experience. In some examples, the opacity of display 402 is adjustable (e.g. via a dimming filter), enabling the display to function both as a substantially opaque display for virtual reality experiences and as a see-through display for augmented reality experiences. HMD device 400 may represent any of the HMD devices described herein. For example, functionality described above in connection with an HMD device, including but not limited to image rendering, image reprojection, image composition, image display, and motion vector processing, may be implemented via HMD device 400.

In augmented reality implementations, display 402 may present augmented reality objects that appear display-locked and/or world-locked. A display-locked augmented reality object may appear to move along with a perspective of the user as a pose (e.g. six degrees of freedom (DOF): x/y/z/ yaw/pitch/roll) of HMD device 400 changes. As such, a display-locked, augmented reality object may appear to occupy the same portion of display 402 and may appear to be at the same distance from the user, even as the user moves in the surrounding physical space. A world-locked, augmented reality object may appear to remain in a fixed location in the physical space, even as the pose of HMD device 400 changes. In some examples, a world-locked object may appear to move in correspondence with movement of a real, physical object. In yet other examples, a virtual object may be displayed as body-locked, in which the object is located to an estimated pose of a user's head or other body part. In still further examples, a virtual object may be displayed as being locked or anchored to a manipulator, in which the object is located to an estimated pose of a user's hand or input device manipulated by the user's hand.

HMD device 400 may take any other suitable form in which a transparent, semi-transparent, and/or non-transparent display is supported in front of a viewer's eye(s). Further, examples described herein are applicable to other types of display devices, including other wearable display devices and non-wearable display devices such as a television, monitor, mobile device display, and head-up display. In some examples, a display device including a non-transparent display may be used to present virtual imagery. Such a display device may overlay virtual imagery (e.g. representations of hand motion and/or objects) on a real-world background presented on the display device as sensed by an imaging system.

Any suitable mechanism may be used to display images via display 402. For example, display 402 may include image-producing elements located within lenses 406. As another example, display 402 may include a liquid crystal on silicon (LCOS) device or organic light-emitting diode (OLED) microdisplay located within a frame 408. In this example, the lenses 406 may serve as, or otherwise include, a light guide for delivering light from the display device to the eyes of a wearer. In yet other examples, display 402 may include a scanning mirror system (e.g. a microelectromechanical display) configured to scan light from a light source in one or more directions to thereby form imagery. In some examples, eye display 402 may present left-eye and right-eye imagery via respective left-eye and right-eye displays.

HMD device 400 includes an on-board computer 404 operable to perform various operations related to receiving user input (e.g. voice input and gesture recognition, eye gaze detection), capturing manipulator motion and the surrounding physical space, processing data regarding manipulator motion and the physical space, presenting imagery (e.g. representations of hands, representations of users, and/or virtual objects) on display 402, and/or other operations described herein. In some implementations, some to all of the computing functions described above may be performed off-board. Example computer hardware is described in more detail below with reference to FIG. 6.

HMD device 400 may include various sensors and related systems to provide information to on-board computer 404. Such sensors may include, but are not limited to, one or more inward facing image sensors 410A and 410B and/or one or more outward facing image sensors 412A, 412B, and 412C of an imaging system 412, an IMU 414, and one or more microphones 416 such as a directional microphone array. The one or more inward facing image sensors 410A, 410B may acquire gaze tracking information from a wearer's eyes (e.g. sensor 410A may acquire image data for one of the wearer's eye and sensor 410B may acquire image data for the other of the wearer's eye). One or more such sensors may be used to implement a sensor system of HMD device 400, for example.

Where gaze-tracking sensors are included, on-board computer 404 may determine gaze directions of each of a wearer's eyes in any suitable manner based on the information received from the image sensors 410A, 410B. The one or more inward facing image sensors 410A, 410B, and on-board computer 404 may collectively represent a gaze detection machine configured to determine a wearer's gaze target or gaze direction on display 402. In other implementations, a different type of gaze detector/sensor may be employed to measure one or more gaze parameters of the user's eyes. Examples of gaze parameters measured by one or more gaze sensors that may be used by on-board computer 404 to determine an eye gaze sample may include an eye gaze direction, head orientation, eye gaze velocity, eye gaze acceleration, and/or change in angle of eye gaze direction. In some implementations, gaze tracking may be recorded independently for both eyes.

Imaging system 412 may collect image data (e.g. images, video) of a surrounding physical space in any suitable form. Image data collected by imaging system 412 may be used to measure physical attributes of the surrounding physical space. While the inclusion of three image sensors 412A-412C in imaging system 412 is shown, the imaging system may implement any suitable number of image sensors. As examples, imaging system 412 may include a pair of grey-scale cameras (e.g. arranged in a stereo formation) configured to collect image data in a single color channel. Alternatively or additionally, imaging system 412 may include one or more color cameras configured to collect image data in one or more color channels (e.g. RGB) in the visible spectrum. Alternatively or additionally, imaging system 412 may include one or more depth cameras configured to collect depth data. In one example, the depth data may take the form of a two-dimensional depth map having a plurality of depth pixels that each indicate the depth from a corresponding depth camera (or other part of HMD device 400) to a corresponding surface in the surrounding physical space. A depth camera may assume any suitable form, such as that of a time-of-flight depth camera or a structured light depth camera. Alternatively or additionally, imaging system 412 may include one or more infrared cameras configured to collect image data in the infrared spectrum. In some examples, an infrared camera may be configured to function as a depth camera. In some examples, one or more cameras may be integrated in a common image sensor—for example, an image sensor may be configured to collect RGB color data and depth data.

Data from imaging system 412 may be used by on-board computer 404 to detect movements, such as gesture-based inputs or other movements performed by a wearer, person, or physical object in the surrounding physical space. In some examples, HMD device 400 may capture manipulator motion performed by a wearer by acquiring image data via imaging system 412 that captures the manipulator motion. In some example, HMD device 400 may formulate articulated hand tracking data based on image data acquired via imaging system 412. HMD device 400 may also image input devices and other objects manipulated by hand motion via imaging system 412. Data from imaging system 412 may be used by on-board computer 404 to determine direction/location and orientation data (e.g. from imaging environmental features) that enables position/motion tracking of HMD device 400 in the real-world environment. In some implementations, data from imaging system 412 may be used by on-board computer 404 to construct still images and/or video images of the surrounding environment from the perspective of HMD device 400. In some examples, HMD device 400 may utilize image data collected by imaging system 412 to perform simultaneous localization and mapping (SLAM) of the surrounding physical space.

IMU 414 may be configured to provide position and/or orientation data of HMD device 400 to on-board computer 404. In one implementation, IMU 414 may be configured as a three-axis or three-degree of freedom (4DOF) position sensor system. This example position sensor system may, for example, include three gyroscopes to indicate or measure a change in orientation of HMD device 400 within three-dimensional space about three orthogonal axes (e.g. roll, pitch, and yaw).

In another example, IMU 414 may be configured as a six-axis or six-degree of freedom (6DOF) position sensor system. Such a configuration may include three accelerometers and three gyroscopes to indicate or measure a change in location of HMD device 400 along three orthogonal spatial axes (e.g. x/y/z) and a change in device orientation about three orthogonal rotation axes (e.g. yaw/pitch/roll). In some implementations, position and orientation data from imaging system 412 and IMU 414 may be used in conjunction to determine a position and orientation (or 6DOF pose) of HMD device 400. In yet other implementations, the pose of HMD device 400 may be computed via visual inertial SLAM.

HMD device 400 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g. visible light cameras, infrared light cameras, time-of-flight depth cameras, structured light depth cameras, etc.), communication devices (e.g. WIFI antennas/interfaces), etc.

The one or more microphones 416 may be configured to collect audio data from the surrounding physical space. Data from the one or more microphones 416 may be used by on-board computer 404 to recognize voice commands provided by the wearer to control the HMD device 400. In some examples, HMD device 400 may record audio data via the one or more microphones 416 by capturing speech uttered by a wearer.

While not shown in FIG. 4, on-board computer 404 may include a logic subsystem and a storage subsystem holding instructions executable by the logic subsystem to perform any suitable computing functions. For example, the storage subsystem may include instructions executable to implement one or more of image rendering, image reprojection, image composition, motion vector processing, and/or manipulator tracking or processing of data regarding manipulator motion.

Figure 5:
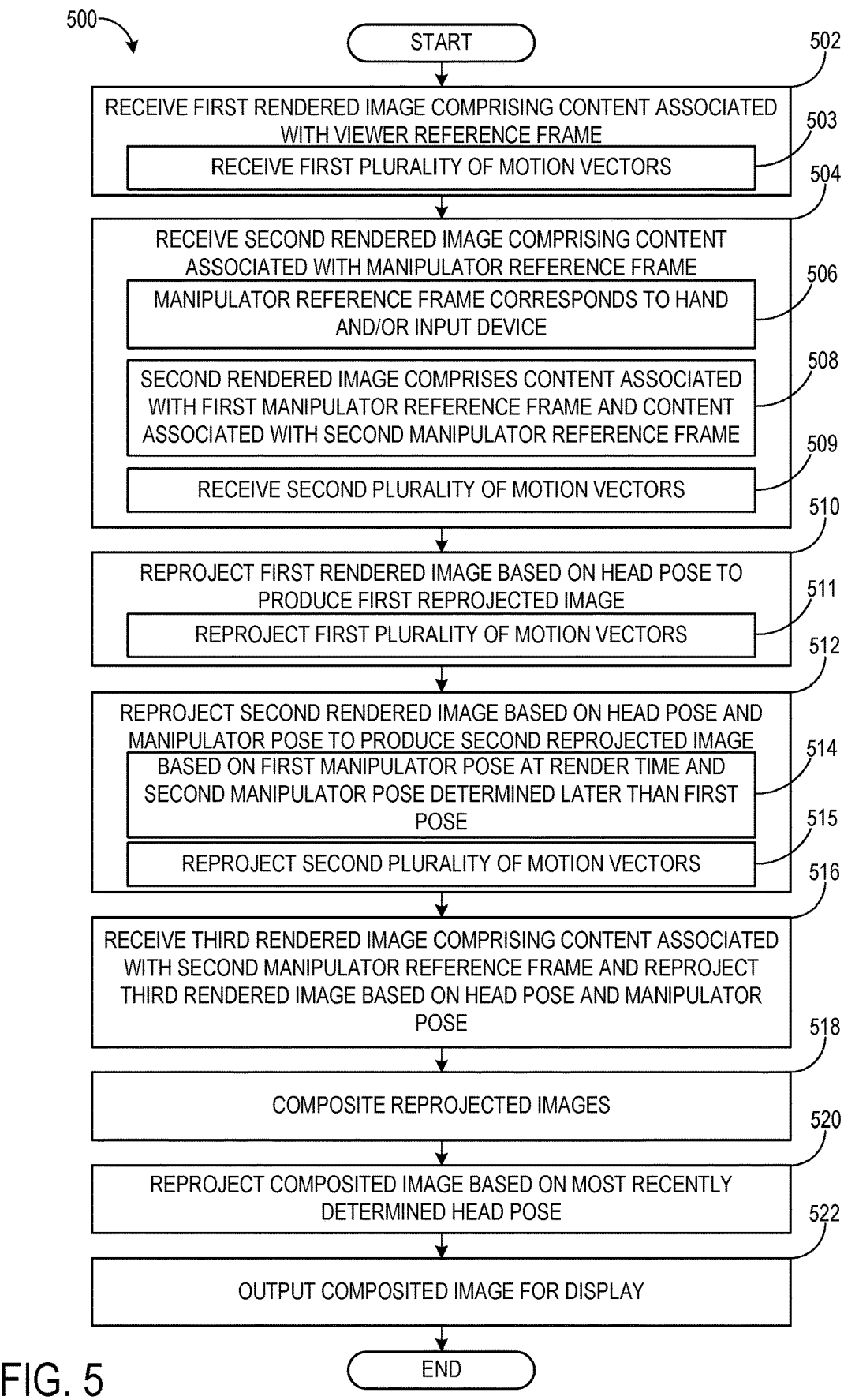
FIG. 5 shows a flowchart illustrating an example method of reprojecting an image comprising manipulator-attached content.

FIG. 5 shows a flowchart illustrating an example method 500 of reprojecting an image comprising manipulator-attached content. Method 500 may be implemented by HMD device 400, for example.

At 502, method 500 includes receiving a first rendered image comprising content associated with a viewer reference frame. The viewer reference frame may be associated with a user of an HMD device or other display device, for example. Receiving the first rendered image further may include receiving 503 a first plurality of motion vectors representing motion in the first rendered image. At 504, method 500 includes receiving a second rendered image comprising content associated with a manipulator reference frame. The manipulator reference frame may correspond 506 to one or more of a hand of a user and an input device operated by the user. The second rendered image may comprise 508 content associated with a first manipulator reference frame corresponding to a left manipulator and content associated with a second manipulator reference frame corresponding to a right manipulator. Receiving the second rendered image further may include receiving 509 a second plurality of motion vectors representing motion in the second rendered image.

At 510, method 500 includes reprojecting the first rendered image based on a head pose of a user to thereby produce a first reprojected image. Reprojecting the first rendered image may include reprojecting 511 the first plurality of motion vectors based on the head pose. At 512, method 500 includes reprojecting the second rendered image based on the head pose of the user and a pose of the manipulator to thereby produce a second reprojected image. Reprojection may include adjusting the position of one or more pixels (e.g., via a matrix transformation) in an image. The second rendered image may be reprojected based 514 on a first manipulator pose at a render time of the second rendered image and also based on a second pose of the manipulator determined later than the first pose (e.g., determined at the time of reprojecting the second rendered image). Reprojecting the second rendered image may include 515 reprojecting the second plurality of motion vectors based on the head pose and the pose of the manipulator.

In some examples, the second rendered image may comprise content associated with a first manipulator reference frame corresponding to one of a left manipulator and a right manipulator. The second rendered image may be reprojected based on the head pose of the user and the pose of the one of the left manipulator and the right manipulator. In such examples, at 516 method 500 may include receiving a third rendered image comprising content associated with a second manipulator reference frame corresponding to the other of the left manipulator and the right manipulator, and reprojecting the third rendered image based on the head pose of the user and a pose of the other of the left manipulator and the right manipulator to thereby produce a third reprojected image.

At 518, method 500 includes compositing the reprojected images to thereby produce a composited image. At 520, method 500 includes reprojecting the composited image based on a most recently determined head pose—e.g., based on a head pose determined later than the head pose used to reproject the first and second rendered images. At 522, method 500 includes outputting the (e.g., reprojected) composited image for display. The composited image may be output for display on an at least partially transparent display (e.g., in augmented reality implementations), an opaque display (e.g., in virtual reality implementations), or on any other suitable display.

It will be understood that the approaches described herein may be implemented in connection with any suitable type of display device. Example display devices include but are not limited to an HMD device, a monitor, television, vehicle display, and head-up display. Further, the disclosed approaches may be applied to content attached to anatomical objects other than hands and/or attached to input devices operated or otherwise associated with anatomical objects other than hands, such as tracking devices that sense motion of one or more feet, a torso, wrist, elbow, and/or other body part(s). Thus, in some examples, "manipulator" may refer to one or more body parts other than a hand and/or an input device operated by or otherwise associated with one or more non-hand body parts, and "manipulator-attached content" may refer to content attached to such non-hand body part(s).

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
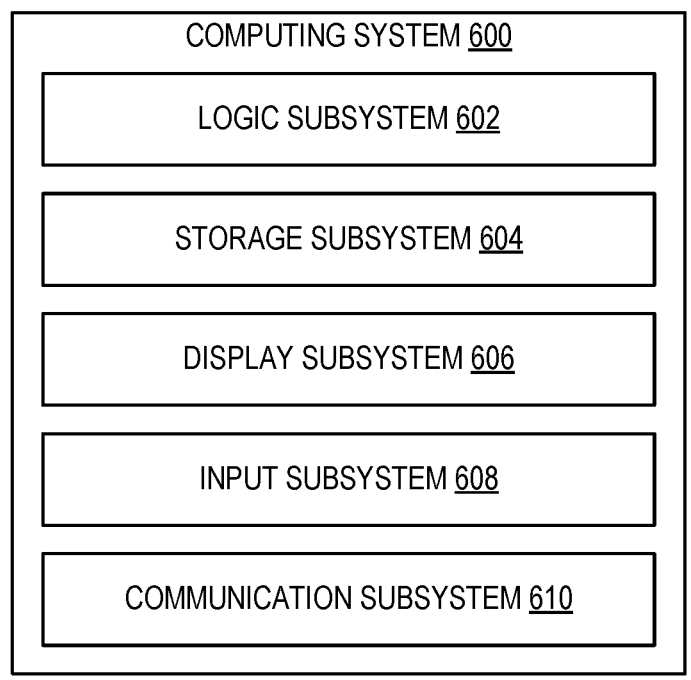
FIG. 6 shows a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic subsystem 602 and a storage subsystem 604. Computing system 600 may optionally include a display subsystem 606, input subsystem 608, communication subsystem 610, and/or other components not shown in FIG. 6.

Logic subsystem 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 604 includes one or more physical devices configured to hold instructions executable by the logic machine to implement the methods and processes described herein. When such methods and processes are implemented, the state of storage subsystem 604 may be transformed—e.g., to hold different data.

Storage subsystem 604 may include removable and/or built-in devices. Storage subsystem 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 602 and storage subsystem 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic subsystem 602 executing instructions held by storage subsystem 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides a method comprising receiving a first rendered image comprising content associated with a viewer reference frame, receiving a second rendered image comprising content associated with a manipulator reference frame, reprojecting the first rendered image based on a head pose of a user to thereby produce a first reprojected image, reprojecting the second rendered image based on the head pose of the user and a pose of the manipulator to thereby produce a second reprojected image, and outputting the first reprojected image and the second reprojected image for display as a composited image. In such an example, the method alternatively or additionally may comprise compositing the first reprojected image and the second reprojected image to thereby produce the composited image, wherein the reprojecting and the compositing is performed at a same device. In such an example, a first device alternatively or additionally may reproject the first rendered image and the second rendered image, and a second device may composite the first reprojected image and the second reprojected image and output the composited image via a display. In such an example, the method alternatively or additionally may comprise reprojecting the composited image based on a most recently determined head pose of the user. In such an example, the manipulator reference frame may correspond to one or more of a hand of the user and an input device operated by the user. In such an example, the second rendered image may comprise content associated with a first manipulator reference frame corresponding to a left manipulator and content associated with a second manipulator reference frame corresponding to a right manipulator. In such an example, the second rendered image may alternatively or additionally comprise content associated with a first manipulator reference frame corresponding to one of a left manipulator and a right manipulator, and the method alternatively or additionally may comprise receiving a third rendered image comprising content associated with a second manipulator reference frame corresponding to the other of the left manipulator and the right manipulator, reprojecting the third rendered image based on the head pose of the user and a pose of the other of the left manipulator and the right manipulator to thereby produce a third reprojected image, and outputting the first reprojected image, the second reprojected image, and the third reprojected image for display as a composited image. In such an example, the method alternatively or additionally may comprise receiving a plurality of motion vectors representing motion in the second rendered image, and updating one or more of the plurality of motion vectors based of the pose of the manipulator. In such an example, the second rendered image alternatively or additionally may be reprojected based on a first pose of the manipulator at a render time of the second rendered image and also based on a second pose of the manipulator determined later than the first pose. In such an example, the first reprojected image and the second reprojected image alternatively or additionally may be output for display as the composited image on an at least partially transparent display.

Another example provides a computing device comprising a logic subsystem, a storage subsystem comprising instructions executable by the logic subsystem to receive a first rendered image comprising content associated with a viewer reference frame, receive a second rendered image comprising content associated with a manipulator reference frame, reproject the first rendered image based on a head pose of a user to thereby produce a first reprojected image, reproject the second rendered image based on the head pose of the user and a pose of the manipulator to thereby produce a second reprojected image, and output the first reprojected image and the second reprojected image for display as a composited image. In such an example, the storage subsystem alternatively or additionally may comprise instructions executable by the logic subsystem to composite the first reprojected image and the second reprojected image to thereby produce the composited image. In such an example, the second rendered image alternatively or additionally may comprise content associated with a first manipulator reference frame corresponding to a left manipulator and content associated with a second manipulator reference frame corresponding to a right manipulator. In such an example, the second rendered image alternatively or additionally may comprise content associated with a first manipulator reference frame corresponding to one of a left manipulator and a right manipulator, and the storage subsystem alternatively or additionally may comprise instructions executable to receive a third rendered image comprising content associated with a second manipulator reference frame corresponding to the other of the left manipulator and the right manipulator, reproject the third rendered image based on the head pose of the user and a pose of the other of the left manipulator and the right manipulator to thereby produce a third reprojected image, and output the first reprojected image, the second reprojected image, and the third reprojected image for display as a composited image. In such an example, the storage subsystem alternatively or additionally may comprise instructions executable to receive a plurality of motion vectors representing motion in the second rendered image, and update one or more of the plurality of motion vectors based of the pose of the manipulator. In such an example, the storage subsystem alternatively or additionally may comprise instructions executable to reproject the composited image based on a most recently determined head pose of the user. In such an example, the second rendered image alternatively or additionally may be reprojected based on a first pose of the manipulator at a render time of the second rendered image and also based on a second pose of the manipulator determined later than the first pose.

Another example provides a method comprising receiving a first rendered image comprising mixed reality content associated with a reference frame of a user, receiving a second rendered image comprising mixed reality content associated with a reference frame of a manipulator controlled by the user, reprojecting the first rendered image based on a head pose of the user to thereby produce a first reprojected image, reprojecting the second rendered image based on the head pose of the user and a pose of the manipulator to thereby produce a second reprojected image, and outputting the first reprojected image and the second reprojected image for display as a composited image on a mixed reality display. In such an example, the method alternatively or additionally may comprise compositing the first reprojected image and the second reprojected image to thereby produce the composited image, wherein the reprojecting and the compositing is performed at a same device. In such an example, the second rendered image alternatively or additionally may be reprojected based on a first pose of the manipulator at a render time of the second rendered image and also based on a second pose of the manipulator determined later than the first pose.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
receiving a first rendered image comprising content associated with a viewer reference frame;
receiving a second rendered image comprising content associated with a manipulator reference frame;
reprojecting the first rendered image based on a head pose of a user to thereby produce a first reprojected image;
reprojecting the second rendered image based on the head pose of the user, a first pose of the manipulator at a render time of the second rendered image, and a second pose of the manipulator determined later than the first pose to thereby produce a second reprojected image; and outputting the first reprojected image and the second reprojected image for display as a composited image.

2. The method of claim 1, further comprising compositing the first reprojected image and the second reprojected image to thereby produce the composited image, wherein the reprojecting and the compositing is performed at a same device.

3. The method of claim 1, wherein a first device reprojects the first rendered image and the second rendered image, and wherein a second device composites the first reprojected image and the second reprojected image and outputs the composited image via a display.

4. The method of claim 1, further comprising reprojecting the composited image based on a most recently determined head pose of the user.

5. The method of claim 1, wherein the manipulator reference frame corresponds to one or more of a hand of the user and an input device operated by the user.

6. The method of claim 1, wherein the second rendered image comprises content associated with a first manipulator reference frame corresponding to a left manipulator and content associated with a second manipulator reference frame corresponding to a right manipulator.

7. The method of claim 1, wherein the second rendered image comprises content associated with a first manipulator reference frame corresponding to one of a left manipulator and a right manipulator, the method further comprising
receiving a third rendered image comprising content associated with a second manipulator reference frame corresponding to the other of the left manipulator and the right manipulator;
reprojecting the third rendered image based on the head pose of the user and a pose of the other of the left manipulator and the right manipulator to thereby produce a third reprojected image; and
outputting the first reprojected image, the second reprojected image, and the third reprojected image for display as the composited image.

8. The method of claim 1, further comprising receiving a plurality of motion vectors representing motion in the second rendered image, and updating one or more of the plurality of motion vectors based of the pose of the manipulator.

9. The method of claim 1, wherein the first reprojected image and the second reprojected image are output for display as the composited image on an at least partially transparent display.

10. A computing device, comprising:
a logic subsystem; and
a storage subsystem comprising instructions executable by the logic subsystem to
receive a first rendered image comprising content associated with a viewer reference frame;
receive a second rendered image comprising content associated with a manipulator reference frame;
reproject the first rendered image based on a head pose of a user to thereby produce a first reprojected image;
reproject the second rendered image based on the head pose of the user, a first pose of the manipulator at a render time of the second rendered image, and a second pose of the manipulator determined later than the first pose to thereby produce a second reprojected image; and
output the first reprojected image and the second reprojected image for display as a composited image.

11. The computing device of claim 10, further comprising instructions executable by the logic subsystem to composite the first reprojected image and the second reprojected image to thereby produce the composited image.

12. The computing device of claim 10, wherein the second rendered image comprises content associated with a first manipulator reference frame corresponding to a left manipulator and content associated with a second manipulator reference frame corresponding to a right manipulator.

13. The computing device of claim 10, wherein the second rendered image comprises content associated with a first manipulator reference frame corresponding to one of a left manipulator and a right manipulator, further comprising instructions executable to
receive a third rendered image comprising content associated with a second manipulator reference frame corresponding to the other of the left manipulator and the right manipulator;
reproject the third rendered image based on the head pose of the user and a pose of the other of the left manipulator and the right manipulator to thereby produce a third reprojected image; and
output the first reprojected image, the second reprojected image, and the third reprojected image for display as the composited image.

14. The computing device of claim 10, further comprising instructions executable to receive a plurality of motion vectors representing motion in the second rendered image, and update one or more of the plurality of motion vectors based of the pose of the manipulator.

15. The computing device of claim 10, further comprising instructions executable to reproject the composited image based on a most recently determined head pose of the user.

16. A method, comprising:
receiving a first rendered image comprising mixed reality content associated with a reference frame of a user;
receiving a second rendered image comprising mixed reality content associated with a reference frame of a manipulator controlled by the user;
reprojecting the first rendered image based on a head pose of the user to thereby produce a first reprojected image;
reprojecting the second rendered image based on the head pose of the user, a first pose of the manipulator at a render time of the second rendered image, and a second pose of the manipulator determined later than the first pose to thereby produce a second reprojected image; and
outputting the first reprojected image and the second reprojected image for display as a composited image on a mixed reality display.

17. The method of claim 16, further comprising compositing the first reprojected image and the second reprojected image to thereby produce the composited image, wherein the reprojecting and the compositing is performed at a same device.

* * * * *